United States Patent [19]

Ruhlmann et al.

[11] Patent Number: 5,712,376
[45] Date of Patent: Jan. 27, 1998

[54] AZO REACTIVE DYES, THEIR PREPARATION AND USE

[75] Inventors: Edmond Ruhlmann, Saint-Louis, France; Laszlo Fekete, Bettingen, Switzerland

[73] Assignee: Ciba Specialty Chemicals Corporation, Tarrytown, N.Y.

[21] Appl. No.: 699,957

[22] Filed: Aug. 20, 1996

[30] Foreign Application Priority Data

Aug. 22, 1995 [CH] Switzerland ................ 2395/95

[51] Int. Cl.$^6$ .................. C09B 62/09; D06P 1/382; D06P 3/66; D06P 3/10
[52] U.S. Cl. .................. 534/634; 534/617; 534/637; 534/638; 534/642
[58] Field of Search .................. 534/634, 638

[56] References Cited

U.S. PATENT DOCUMENTS

| | | | |
|---|---|---|---|
| 4,906,739 | 3/1990 | Seiler et al. | 534/638 |
| 5,243,033 | 9/1993 | Tzikas | 534/634 |
| 5,552,532 | 9/1996 | Klier et al. | 534/612 |

FOREIGN PATENT DOCUMENTS

| | | |
|---|---|---|
| 0458743 | 11/1991 | European Pat. Off. . |
| 0495753 | 7/1992 | European Pat. Off. . |
| 0625549 | 11/1994 | European Pat. Off. . |
| 2314946 | 10/1974 | Germany . |
| 0869279 | 5/1961 | United Kingdom ............ 534/634 |

OTHER PUBLICATIONS

Research Disclosure, vol. 219, No. 026, p. 257, (1982).

*Primary Examiner*—Floyd D. Higel
*Attorney, Agent, or Firm*—David R. Crichton; Kevin T. Mansfield

[57] ABSTRACT

Described are compounds of formula

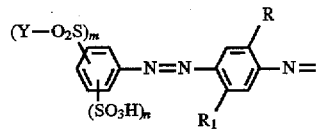

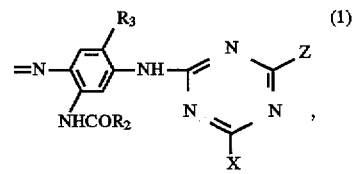

(1)

which are suitable as fiber-reactive dyes for dyeing a wide range of fiber materials.

16 Claims, No Drawings

AZO REACTIVE DYES, THEIR PREPARATION AND USE

The present invention relates to novel azo reactive dyes, to a process for their preparation and to their use.

The practice of dyeing with reactive dyes in recent years has led to more exacting demands being made on the quality of the dyeings obtained and on the efficiency of the dyeing process. Consequently there is a continuing need to provide novel reactive dyes that have enhanced properties, especially with respect to application.

At the present time it is required of reactive dyes that they shall have sufficient substantivity for the substrate to be dyed and at the same time have the property that unfixed dye is easily washed off. They are further required to afford a good tinctorial yield and have high reactivity to give in particular dyeings of good fixation. The known dyes do not meet these requirements in all respects.

It is therefore the object of this invention to provide novel, improved reactive dyes for dyeing and printing fiber materials that have the qualities referred to above to a high degree. The novel dyes shall in particular be distinguished by high fixation yields and high fiber-bond stability, and it shall furthermore be possible to wash off unfixed dye in the fiber with ease. The novel dyes shall also produce dyeings with good allround fastness properties, preferably light- and wetfastness properties.

It has been found that this object is substantially achieved with the novel reactive dyes defined below.

The invention relates to compounds of formula

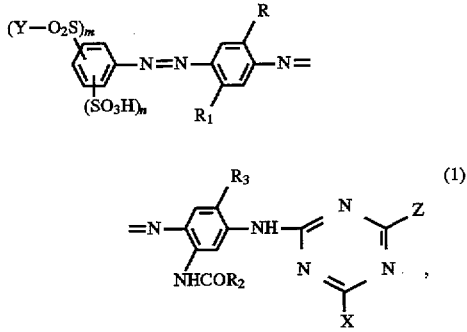

wherein R is $C_1$–$C_4$alkyl or $C_1$–$C_4$alkoxy which is unsubstituted or substituted in the alkyl moiety by hydroxy, $C_1$–$C_4$alkoxy or sulfato, $R_1$ is $C_1$–$C_4$alkyl or a —NHCOR$_2$' group, $R_2$ and $R_2$' are each independently of the other $C_1$–$C_4$alkyl or —NH$_2$, $R_3$ is hydrogen, $C_1$–$C_4$alkyl, $C_1$–$C_4$alkoxy or halogen, X is halogen, Y is vinyl or a —CH$_2$—CH$_2$—U radical and U is a leaving group, m is 0 or 1, and n is a number from 0 to 2, the sum of (n+m) being $\geq 1$, and Z is a non-reactive amino radical, or a radical of formula

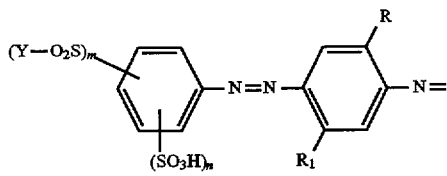

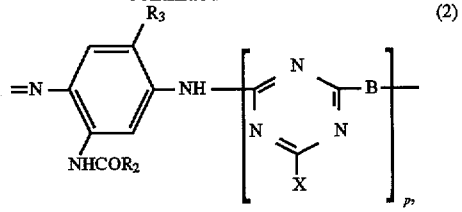

wherein R, $R_1$, $R_2$, $R_3$, X, m and n have the meaning given above, B is the radical of an aliphatic, aromatic, araliphatic or cycloaliphatic diamine, and p is 0 or 1.

Sulfo groups present in the compounds of formula (1) can generally be in the form of a free acid (—SO$_3$H) as well as in any salt form, typically in the form of an alkali metal salt, alkaline earth metal salt or ammonium salt or in the form of a salt of an organic amine such as the sodium, potassium, lithium or ammonium salt, the salt of triethanolamine or the mixed salt of two or more than two different cations, for example the mixed salt of Na/Li, Na/NH$_4$ or Na/Li/NH$_4$.

$C_1$–$C_4$Alkyl is typically methyl, ethyl, n- or isopropyl or n-, iso-, sec- or tert-butyl, preferably methyl or ethyl and, particularly preferably, methyl. $C_1$–$C_4$Alkoxy is typically methoxy, ethoxy, n- or isopropoxy or n-, iso-, sec- or tert-butoxy, preferably methoxy or ethoxy and, particularly preferably, methoxy. Halogen is typically fluoro, chloro or bromo. Chloro or fluoro are preferred.

Where Y is defined as a —CH$_2$—CH$_2$—U radical, the leaving group U can be, for example, —Cl, —Br, —F, —OSO$_3$H, —SSO$_3$H, —OCO—CH$_3$, OPO$_3$H$_2$, —OCO—C$_6$H$_5$, OSO$_2$—C$_1$–C$_4$alkyl or —OSO$_2$—N(C$_1$–C$_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, more preferably —Cl or —OSO$_3$H and, most preferably, —OSO$_3$H.

Y is preferably vinyl, β-cloroethyl, β-sulfatoethyl, β-thiosulfatoethyl, β-acetoxyethyl, β-phenoxyethyl or β-phosphatoethyl. β-sulfatoethyl or vinyl are particularly preferred.

If m is 1, then n is preferably 0. m is preferably 0, and n is 1 or, preferably, 2.

X is preferably fluoro or chloro. Fluoro is particularly preferred.

A group of suitable compounds of formula (1) are those compounds, wherein R is $C_1$–$C_4$alkyl, preferably methyl or ethyl and, particularly preferably, methyl.

Another group of suitable compounds of formula (1) are those compounds, wherein R is $C_1$–$C_4$alkoxy, preferably methoxy or ethoxy and, particularly preferably, methoxy.

A third group of suitable compounds of formula (1) are those compounds, wherein R is $C_1$–$C_4$alkoxy which is substituted in the alkyl moiety by hydroxy, methoxy, ethoxy or sulfato, preferably $C_1$–$C_2$alkoxy which is substituted in the alkyl moiety by hydroxy, methoxy or sulfato and, particularly preferably, β-hydroxyethoxy, β-sulfatoethoxy or β-hydroxyethoxy.

R is preferably methyl, ethyl, methoxy, ethoxy, or $C_1$–$C_2$alkoxy which is substituted in the alkyl moiety by hydroxy, methoxy or sulfato. R is particularly preferably methyl, methoxy, β-hydroxyethoxy, β-sulfatoethoxy or β-hydroxyethoxy.

$R_1$ defined as $C_1$–$C_4$alkyl is preferably methyl or ethyl and, particularly preferably, methyl.

Where $R_1$ is defined as a —NHCOR$_2$' radical, $R_2$' is preferably methyl, ethyl or —NH$_2$, more preferably methyl or ethyl and, most preferably, methyl.

$R_1$ is preferably methyl, —NHCOCH$_3$, —NHCOC$_2$H$_5$ or —NHCONH$_2$ and, particularly preferably, methyl or —NHCOCH$_3$.

$R_2$ is preferably methyl, ethyl or —$NH_2$, more preferably methyl or —$NH_2$ and, most preferably, —$NH_2$.

$R_3$ is preferably hydrogen, methyl, ethyl, methoxy, ethoxy or chloro, more preferably hydrogen, methyl, methoxy or chloro and, most preferably, hydrogen.

Z defined as an unreactive amino radical can typically be amino; N—$C_1$-$C_4$alkylamino or N,N-di-$C_1$-$C_4$alkylamino, wherein alkyl can in each case be substituted by e.g. sulfo, sulfato, hydroxy, carboxy or phenyl; cyclohexylamino; phenylamino or naphthylamino, wherein phenyl or naphthyl can in each case be substituted by e.g. $C_1$-$C_4$alkyl, $C_1$-$C_4$alkoxy, amino, $C_2$-$C_4$alkanoylamino, carboxy, sulfo or halogen; N—$C_1$-$C_4$alkyl-N-phenylamino, wherein alkyl and phenyl can be unsubstituted or substituted as described above, or morpholino.

Illustrative examples of suitable unreactive amino radicals Z are amino, methylamino, ethylamino, β-hydroxyethylamino, N,N-di-β-hydroxyethylamino, β-sulfoethylamino, cyclohexylamino, o-, m- or p-methylphenylamino, o-, m- or β-methoxyphenylamino, o-, m- or p-sulfophenylamino, 2,4- or 2,5-disulfophenylamino, 2- or 3-sulfo-4-methoxyphenylamino, 2- or 3-sulfo-4-methylphenylamino, 4-methyl-2,5-disulfophenylamino, o-carboxyphenylamino, 1- or 2-naphthylamino, 1-sulfo-2-naphthylamino, 1,5-disulfo-2-naphthylamino, 6,8-disulfo-2-naphthylamino, 4,8-disulfo-2-naphthylamino, 4,6,8-trisulfo-2-naphthylamino, 1,5,7-trisulfo-2-naphthylamino, 3,6,8-trisulfo-2-naphthylamino, 1,6-disulfo-2-naphthylamino, N-ethyl-N-phenylamino, N-methyl-N-phenylamino, N-β-sulfoethyl-N-phenylamino, β-hydroxyethyl-N-phenylamino, and morpholino.

Z defined as an unreactive amino radical is preferably amino, N-mono- or N,N-di-$C_1$-$C_2$alkylamino, each of, which is unsubstituted or substituted by hydroxy, sulfo or sulfato, cyclohexylamino, phenylamino or naphthylamino, each of which is unsubstituted or substituted by methyl, methoxy, carboxy or sulfo, N—$C_1$-$C_2$alkyl-N-phenylamino or morpholino and, particularly preferably, amino, unsubstituted or sulfo-substituted N-mono- or N,N-di-$C_1$-$C_2$alkylamino, phenylamino which is substituted by 1 to 3 identical radicals selected from the group consisting of methyl, methoxy and sulfo, and 1- or 2-naphthylamino carrying 1 to 3 sulfo groups.

Where Z is defined as a radical of formula (2) above, R, $R_1$, $R_2$, $R_3$, X, Y, m and n in each case have the meanings and preferred meanings cited above.

p is preferably 1.

The diamino radical B typically corresponds to formula $$—NR_4—B_1—NR_4'—; \quad (3),$$

wherein $B_1$ is an aliphatic, cycloaliphatic, aromatic or araliphatic linking group, and $R_4$ and $R_4'$ are each independently of the other hydrogen or $C_1$-$C_4$alkyl which is unsubstituted or substituted by hydroxy, $C_1$-$C_4$alkoxy or sulfato.

$R_4$ and $R_4'$ are each independently of the other preferably hydrogen, methyl or ethyl. Hydrogen is particularly preferred.

$B_1$ defined as an aliphatic linking group can typically be straight-chain or branched $C_2$-$C_{12}$alkylene which is unsubstituted or substituted by hydroxy, sulfo or sulfato or which is interrupted by —O—, —NH— or —N($CH_3$)—. Typical examples are 1,2-ethylene, 1-methyl-1,2-ethylene, 1,1-dimethyl-1,2-ethylene, 1,2-dimethyl-1,2-ethylene, 1,1,2,2-tetramethyl-1,2-ethylene, 1,3-propylene, 2,2-dimethyl-1,3-propylene, 2-hydroxy-1,3-propylene, 1,4-butylene, 1,6-hexylene, 2-methyl-1,5-pentylene, —$CH_2CH_2$—O—$CH_2CH_2$—O—$CH_2CH_2$—, —$(CH_2)_3$—O—$(CH_2)_3$—O—$(CH_2)_3$— or —$CH_2CH_2$—NH—$CH_2CH_2$—.

$B_1$ is preferably straight-chain or branched $C_2$-$C_6$alkylene which is unsubstituted or substituted by hydroxy and, particularly preferably, straight-chain or branched $C_2$-$C_6$alkylene. Typical examples of particularly preferred alkylene radicals $B_1$ are 1,2-ethylene, 1-methyl-1,2-ethylene, 1,3-propylene, 2-methyl-1,5-pentylene and 1,6-hexylene. $B_1$ defined as a cycloaliphatic linking group is typically 1,2-, 1,3- or 1,4-cyclohexylene, the radical of formula

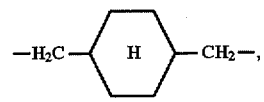

or $B_1$, together with —$NR_4$— and —$NR_4'$—, forms a piperazine ring.

Illustrative examples of aromatic linking groups $B_1$ are 1,2-, 1,3- or 1,4-phenylene, each of which is unsubstituted or substituted by e.g. sulfo, methyl, methoxy or chloro, unsubstituted or sulfo-substituted naphthylene, or a radical of formula

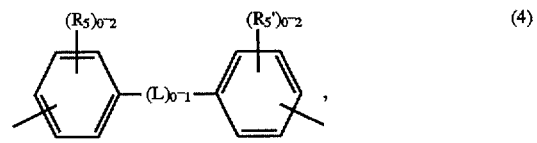

wherein L is typically —CO—, —NHCO—, —NHCONH—, —$(CH_2)_{1-4}$—, —NH—, —CH=CH—, —O—, —$SO_2$— or —N=N—, and $(R_5)_{0-2}$ and $(R_5')_{0-2}$ are each independently of the other 0 to 2 identical or different radicals selected from the group consisting of sulfo, methyl, methoxy and chloro.

Preferred aromatic linking groups $B_1$ are 1,3- or 1,4-phenylene, each of which is unsubstituted or substituted by sulfo, methyl or methoxy, naphthylene which is substituted by 1 or 2 sulfo groups, or a radical of formula

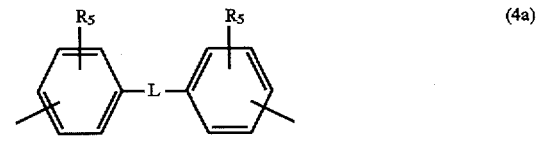

or

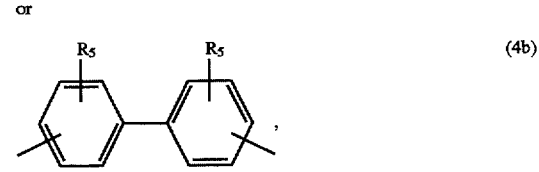

wherein L is —NHCONH—, —O—, —NH—, —CH=CH— or —$CH_2$—, and $R_5$ is hydrogen or sulfo.

Illustrative examples of particularly preferred aromatic linking groups $B_1$ are 1,3-phenylene, 1,4-phenylene, 4-methyl-1,3-phenylene, 4-sulfo-1,3-phenylene, 3-sulfo-1,4-phenylene, 3,6-disulfo-1,4-phenylene, 4,6-disulfo-1,3-phenylene, 3,7-disulfo-1,5-naphthylene, 4,8-disulfo-2,6-naphthylene, 2,2'-disulfo-4,4'-diphenylene, 4,4'-phenyleneurea-2,2'-disulfonic acid and 2,2'-disulfo-4,4'-stilbenylene.

$B_1$ defined as an araliphatic linking group is typically unsubstituted or sulfo-substituted benzylene, methoxyphenylene or dimethylene-1,2-phenylene, dimethylene-1,3-phenylene or dimethylene-1,4-phenylene.

A preferred embodiment of this invention relates to compounds of formula

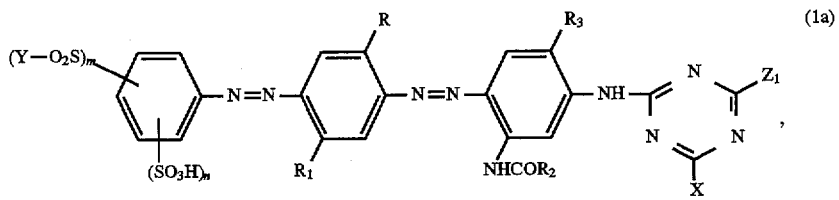 (1a)

wherein R, $R_1$, $R_2$, $R_3$, X, Y, m and n each have the meanings and preferred meanings cited above, and $Z_1$ has the meanings and preferred meanings cited above for Z in the definition of a non-reactive amino radical. Particularly preferred compounds are those of formula (1a), wherein R is methyl, methoxy, β-hydroxyethoxy, β-sulfatoethoxy or β-hydroxyethoxy, $R_1$ is methyl or a —NHCOR$_2$' group, $R_2$ and $R_2$' are each independently of the other methyl or —NH$_2$, $R_3$ is hydrogen, methyl, methoxy or chloro, X is fluoro, m is 0, n is 1 or 2 and $Z_1$ is amino, unsubstituted or sulfo-substituted N-mono- or N,N-di-$C_1$-$C_2$alkylamino, phenylamino which is substituted by 1 to 3 identical radicals selected from the group consisting of methyl, methoxy and sulfo, 1- or 2-naphthylamino carrying 1 to 3 sulfo groups.

Another preferred embodiment of this invention relates to compounds of formula

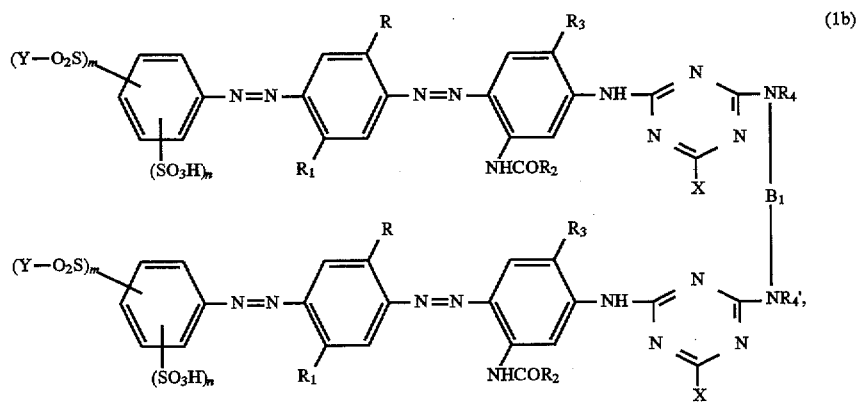 (1b)

wherein $B_1$, R, $R_1$, $R_2$, $R_3$, $R_4$,$R_4$', X, Y, m and n each have the meanings and preferred meanings cited above. Particularly preferred compounds are those of formula (1b), wherein R is methyl, methoxy, β-hydroxyethoxy, β-sulfatoethoxy or β-hydroxyethoxy, $R_1$ is methyl or a —NHCOR$_2$' group, $R_2$ and $R_2$' are each independently of the other methyl or —NH$_2$, $R_3$ is hydrogen, methyl, methoxy or chloro, $R_4$ and $R_4$' are each hydrogen, X is fluoro, m is 0, n is 1 or 2 and $B_1$ is straight-chain or branched $C_2$-$C_6$-alkylene which is unsubstituted or substituted by hydroxy.

Another preferred embodiment of this invention relates to compounds of formula

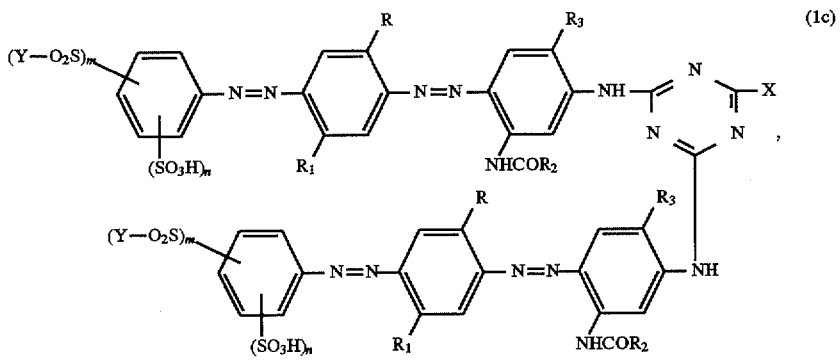

wherein R, $R_1$, $R_2$, $R_3$, X, Y, m and n each have the meanings and preferred meanings cited above. Particularly preferred compounds are those of formula (1c), wherein R is methyl, methoxy, β-hydroxyethoxy, β-sulfatoethoxy or β-hydroxyethoxy, $R_1$ is methyl or a —NHCOR$_2$' group, $R_2$ and $R_2$' are each independently of the other methyl or —NH$_2$, $R_3$ is hydrogen, methyl, methoxy or chloro, X is fluoro, m is 0 and n is 1 or 2.

The preparation of the compounds of formula (1) and, in particular, of formula (1a) comprises condensing an aminodiazo compound of formula

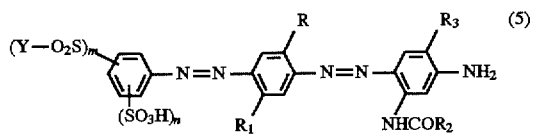

with a triazine of formula

and an amine of formula

in any order, R, $R_1$, $R_2$, $R_3$, X, Y, Z, m and n each having the meaning cited above.

The compounds of formula (1b) are usefully prepared by condensing c. 1 molar equivalent of the compounds of the above formula (5) with about 1 molar equivalent of trihalotriazine of the above formula (6) and reacting the dihalotriazinyl compounds so obtained with about 0.5 molar equivalent of a diamine of formula

wherein B has the meaning cited above. Alternatively it is also possible to condense 1 molar equivalent of the diamine of formula (8) first with c. 2 molar equivalents of trihalotriazine of formula (6) and then with c. 2 molar equivalents of aminodiazo compound of formula (5).

The compounds of formula (1c) are usefully prepared by condensing c. 2 molar equivalents of the aminodiazo compound of the above formula (5) with about 1 molar equivalent of trihalotriazine of the above formula (6).

The preparation of the aminodiazo compounds of formula (5) is known per se or is carried out in general accordance with known processes by suitable diazotisation and coupling steps. Diazotisation of the diazo components is usually carried out by the action of nitric acid in aqueous mineral acid solution at low temperatures, for example with nitrites such as sodium nitrite in hydrochloric solution in the temperature range from 0°–5° C., and coupling to the coupling components is carried out at weakly acidic, neutral or weakly alkaline pH, typically at pH 3 to 10.

The condensation of the trihalotriazine of formula (6) with the amino compounds of formula (5), (7) or (8) is preferably carried out in aqueous solution or suspension at low temperatures in the range from e.g. 0° to 30° C. and at a weakly acidic, neutral or weakly alkaline pH, so that in the final reactive dye of formula (1) a halogen atom remains which can still be separated. Hydrogen halide which is freed during the condensation is usefully neutralised continuously by the addition of aqueous alkali metal hydroxides, alkali metal carbonates or alkali metal bicarbonates.

The compounds of formula (1) are suitable as reactive dyes for dyeing or printing a wide range of materials, preferably hydroxyl group-containing or nitrogen-containing fiber materials. Illustrative examples of nitrogen-containing fiber materials are silk, wool, polyamide fibers, polyurethanes and blends containing these materials. Typical examples of hydroxyl group-containing materials are natural fiber materials such as linen, hemp, jute or, in particular, cotton, cellulose, regenerated cellulose and blends containing these materials. The reactive dyes of this invention are particularly suitable for dyeing or printing cotton as well as cotton-containing blends, typically blends of cotton and polyester or cotton and polyamide.

The novel compounds of formula (1) are fiber-reactive. Fiber-reactive compounds will be understood to be those compounds which are capable of reacting with the hydroxyl groups of cellulose and with the amino, carboxyl, hydroxyl or thiol groups in wool and silk, or with the amino groups and, where present, with the carboxyl groups of synthetic polyamides with formation of covalent chemical bonds.

The novel dyes can be fixed on the fiber material by different methods, preferably in the form of aqueous dye solutions or printing pastes. They are suitable for dyeing by the exhaust process as well as by the pad dyeing process, and they can be used at low dyeing temperatures and require only short steaming times in the pad-steam process. Fixation is good and unfixed dye can be easily washed off, the difference between degree of exhaustion and degree of fixation being remarkably small, i.e. the soap loss is very insignificant. The reactive dyes of formula (1) are also suitable for printing, especially on cotton, but also for printing nitrogen-containing fibers such as wool, silk or blends which contain wool. Liquid formulations of the compounds of formula (1) and printing pastes containing said compounds are distinguished by good storage stability.

The dyeings and prints on cellulose materials obtained with the dyes of this invention have superior tinctorial strength and high fiber-dye bonding stability in the acid as well as in the alkaline range. In addition, they have good lightfastness and very good wetfastness properties such as fastness to washing, water, seawater, cross-dyeing and perspiration, as well as good fastness to pleating, ironing, rubbing and chlorine.

The invention is illustrated by the following Examples in which, unless otherwise stated, temperatures are given in degrees Celsius and parts and percentages are by weight. The ratio of parts by weight to parts by volume is the same as that of the kilogram to the liter.

EXAMPLE 1

60.6parts of the aminodiazo compound of formula

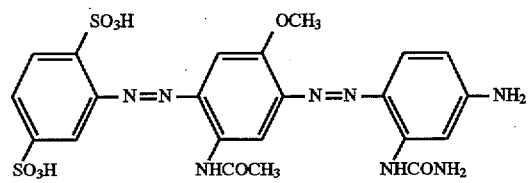 (101)

(prepared in conventional manner by diazotising the compound of formula

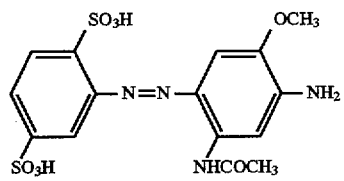

and coupling the diazonium compound so obtained to 3-ureidoaniline) are dissolved neutrally in 600 parts of water and, after the addition of 150 parts of ice, are mono-condensed at 0° C. and at pH 7 with 14.5 parts of cyanuric fluoride. The difluorotriazinyl compound so obtained is then condensed with 12.5 parts of taurine at about 25° C. and at pH 9. After concentrating the condensation product by evaporation, the compound of

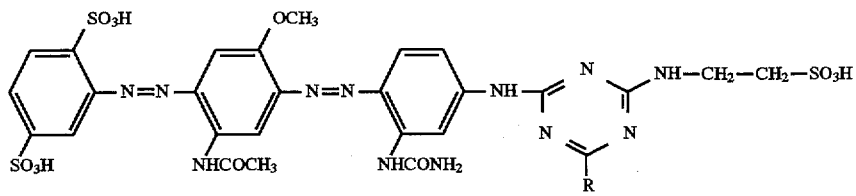

is obtained, which dyes cotton in a brown shade having good allround fastness properties.

EXAMPLE 2

The procedure of Example 1 is repeated, but replacing the aminodiazo compound of formula (101) with 67.4 parts of the aminodiazo compound of formula

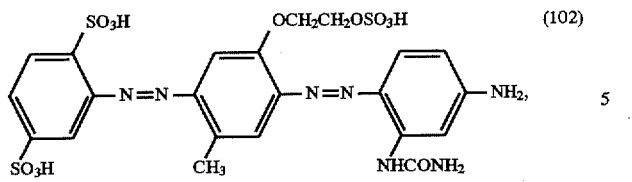 (102)
to give the compound of formula
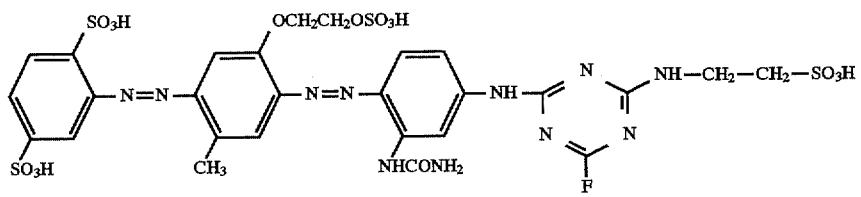
which also dyes cotton in a brown shade having good allround fastness properties.
EXAMPLE 3a–3d
The procedure of Example 1 is repeated, but replacing the aminodiazo compound of formula (101) with 59.4 pads of the aminodiazo compound of formula
 (103a)
 (103b)
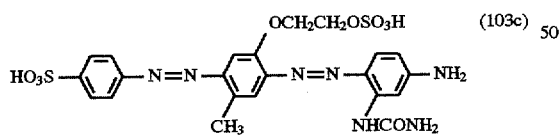 (103c)
or
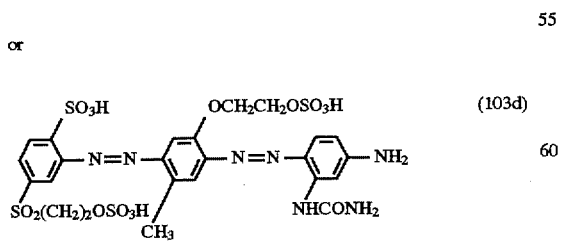 (103d)
to give the compounds of formulae

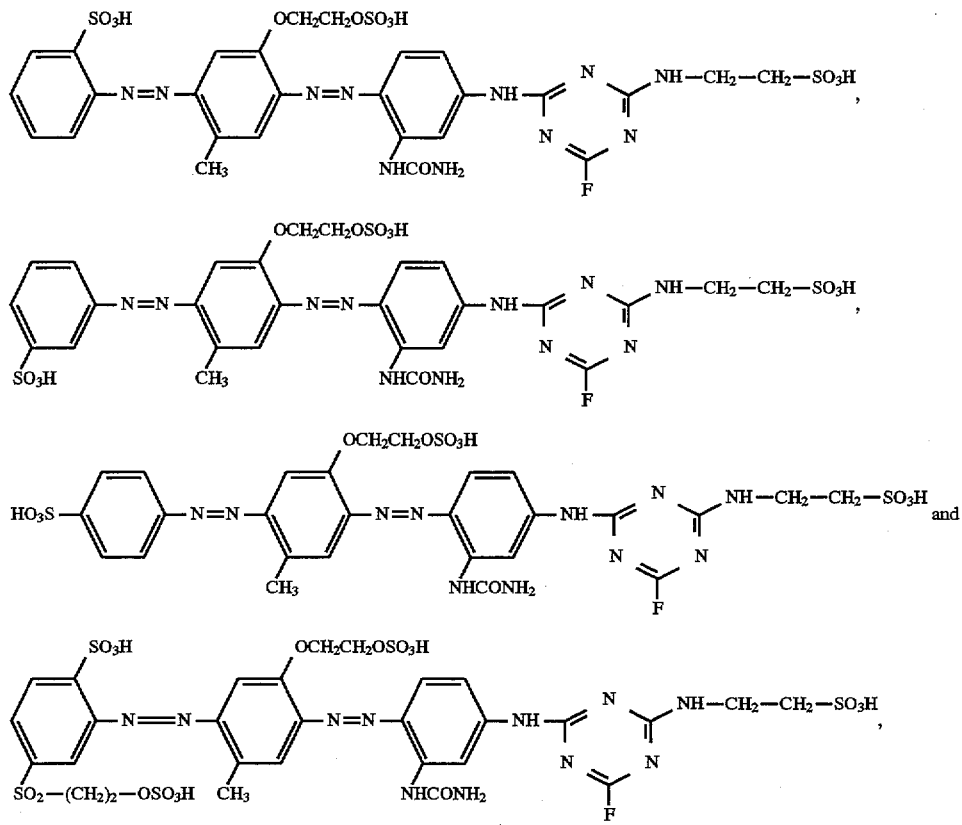

which also dye cotton in a brown shade having good allround fastness properties.

EXAMPLE 4

The procedure of Example 1 is repeated, but replacing the aminodiazo compound of formula (101) with 59.4 parts of the aminodiazo compound of formula

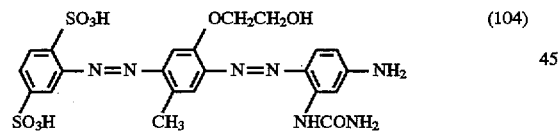
(104)

to give the compound of formula

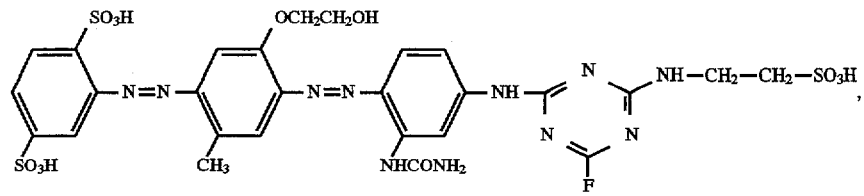

which also dyes cotton in a brown shade having good allround fastness properties.

EXAMPLES 5–7i

The following compounds can be prepared in general accordance with the procedure of Example 1.

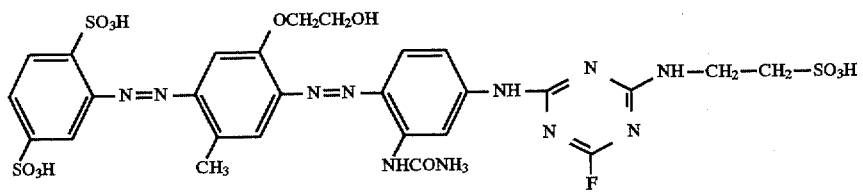
5
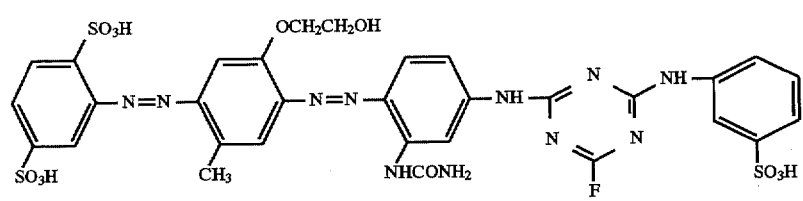
6
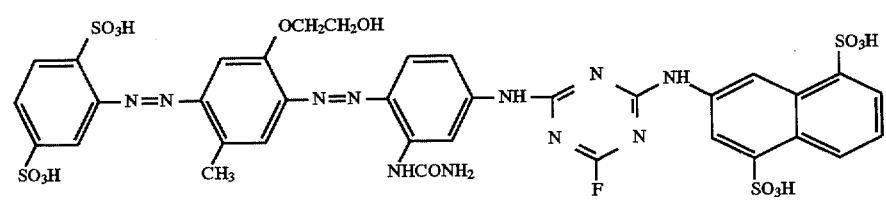
7
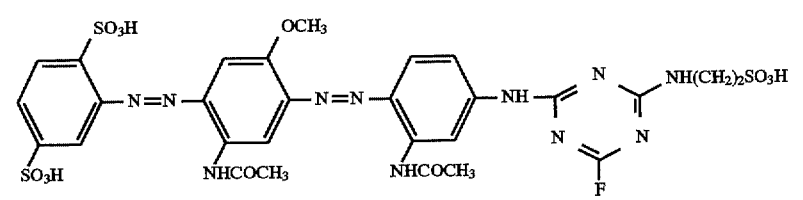
7a
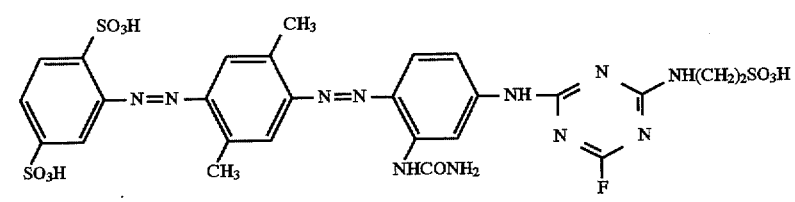
7b
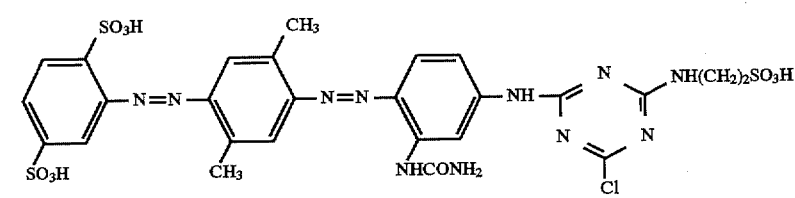
7c
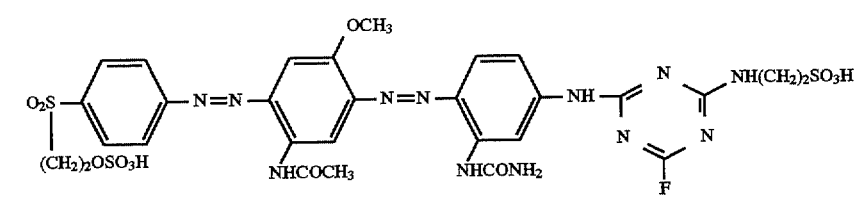
7d
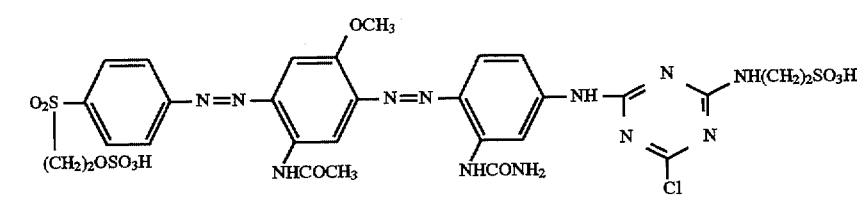
7e -continued

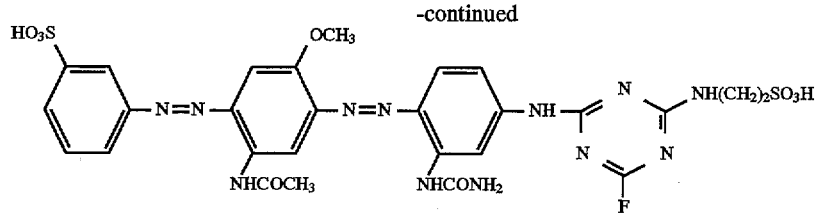
7f

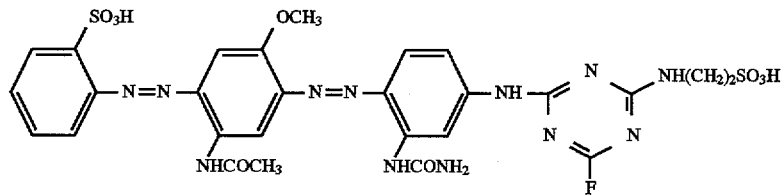
7g

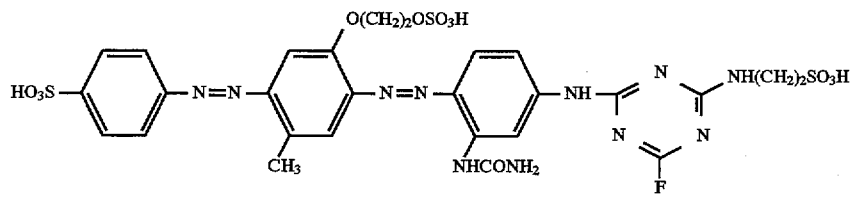
7h

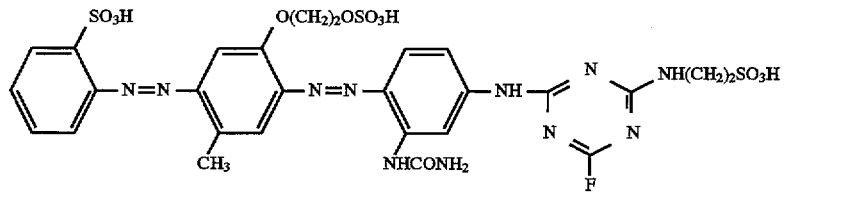
7i

EXAMPLE 8

60.6 parts of the aminodiazo compound of formula (101) according to Example 1 are dissolved neutrally in 600 parts of water and, after the addition of 150 parts of ice, are monocondensed at 0° C. and at pH 7 with 14.5 parts of cyanuric fluoride. The difluorotriazinyl compound so obtained is then condensed at about 25° C. and at pH 9 with 3.7 parts of 1,2-propylenediamine. After concentrating the condensation product by evaporation, the compound of formula is obtained, which dyes cotton in a brown shade having good allround fastness properties.

EXAMPLE 9

The procedure of Example 8 is repeated, but replacing the aminodiazo compound of formula (101) with 67.4 parts of the aminodiazo compound of formula (102) to give the compound of formula

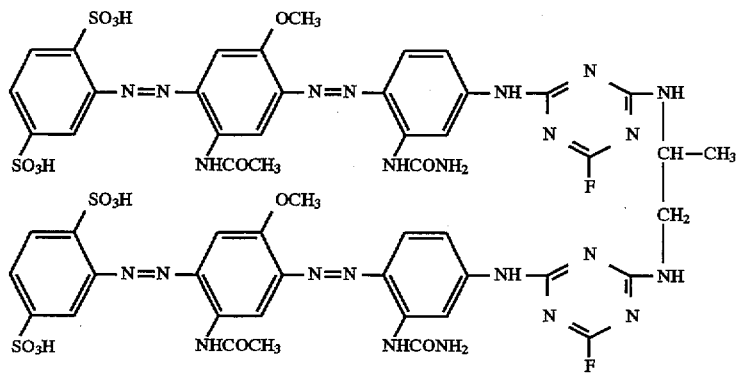

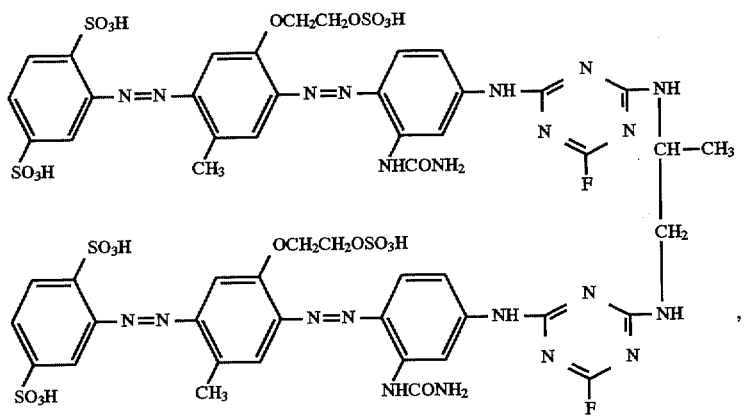
which also dyes cotton in a brown shade having good allround fastness properties.
EXAMPLES 10a–10c
The procedure of Example 8 is repeated, but replacing the aminodiazo compound of formula (101) with 59.4 parts of the aminodiazo compound of formula (103a), (103b) or (103c) according to Example 3 to give the compounds formula
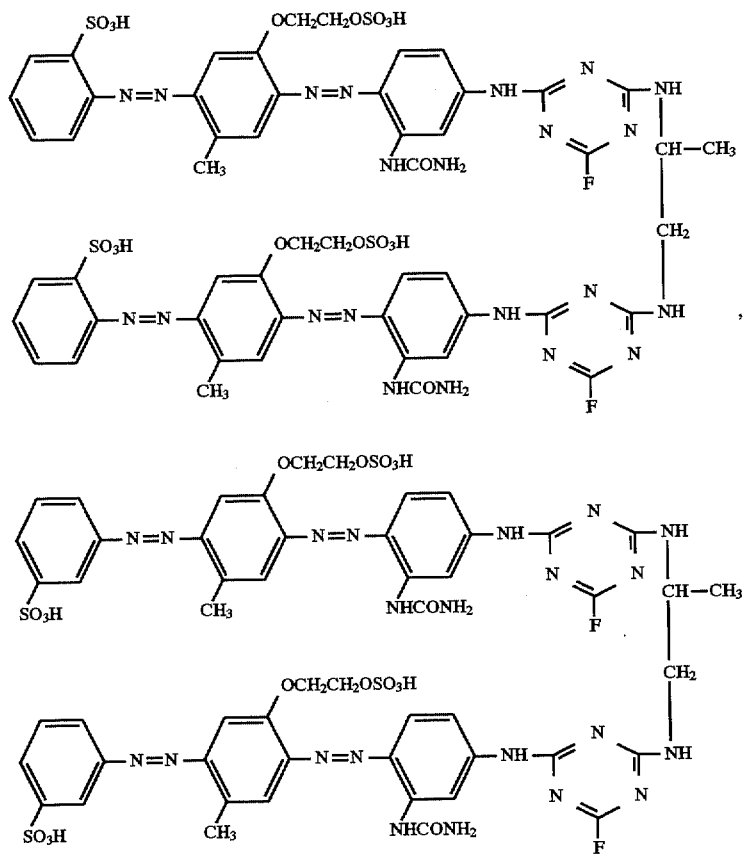
or -continued

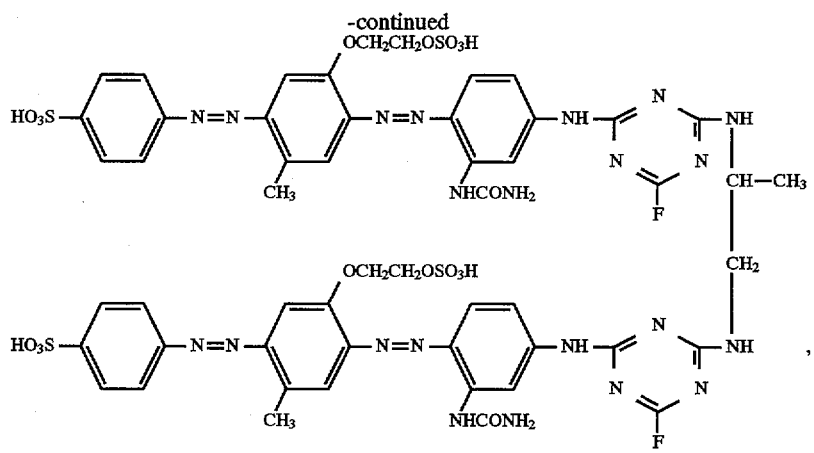

which also dye cotton in a brown shade having good allround fastness properties.

EXAMPLE 11

The procedure of Example 8 is repeated, but replacing the aminodiazo compound of formula (101) with 59.4 parts of the aminodiazo compound of formula (104) according to Example 4 to give the compound of formula

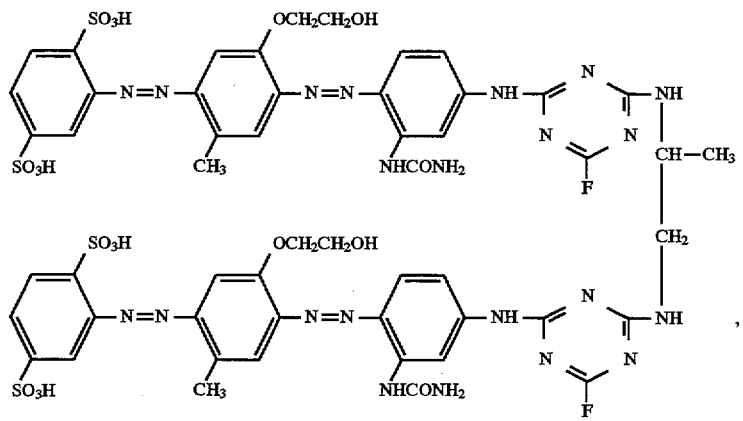

which also dyes cotton in a brown shade having good allround fastness properties.

EXAMPLES 12–15a

The compounds of the general formula

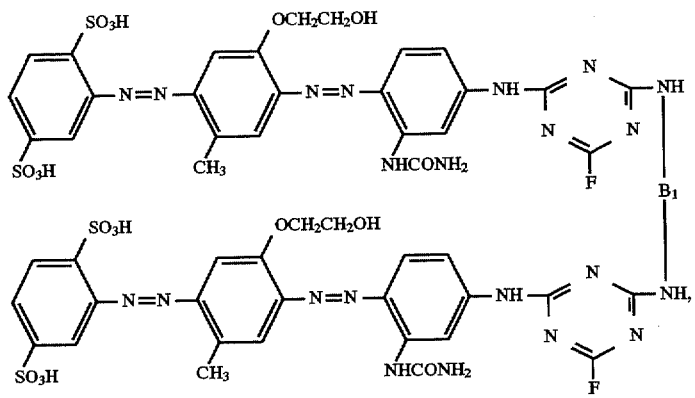
wherein $B_1$ has the meaning indicated in the Table, can be prepared in general accordance with the procedure of Example 11, which compounds also dye cotton in a brown shade having good allround fastness properties.
| Example No. | $B_1$ |
|---|---|
| 12 | —$CH_2$-$CH_2$- |
| 13 | —$CH_2$-$CH_2$-$CH_2$- |
| 14 | —$CH_2$-$CH(OH)$-$CH_2$- |
| 15 | —$CH_2$-$CH(CH_3)$-$CH_2$-$CH_2$-$CH_2$- |
| 15a | —$CH_2$-$C(CH_3)_2$-$CH_2$- |
EXAMPLES 16–18
The compounds of formulae
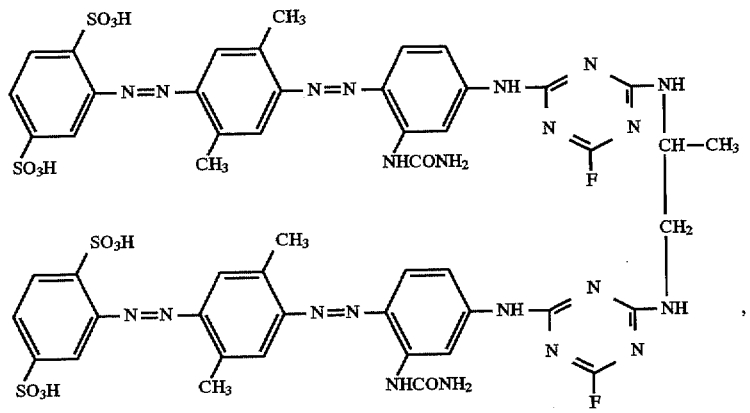
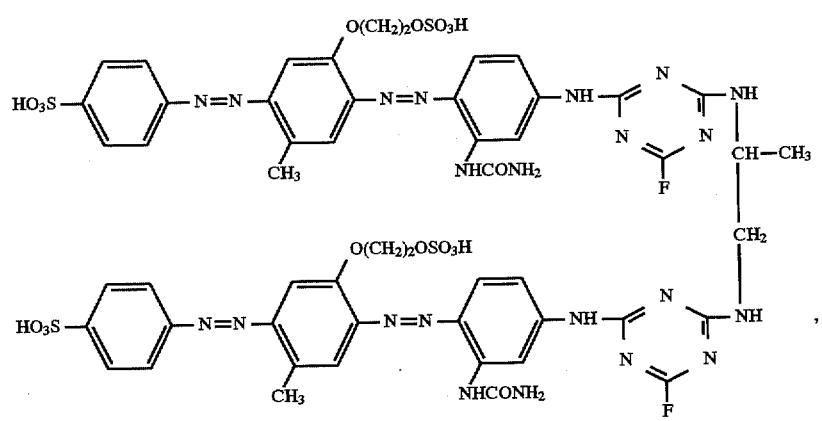

-continued

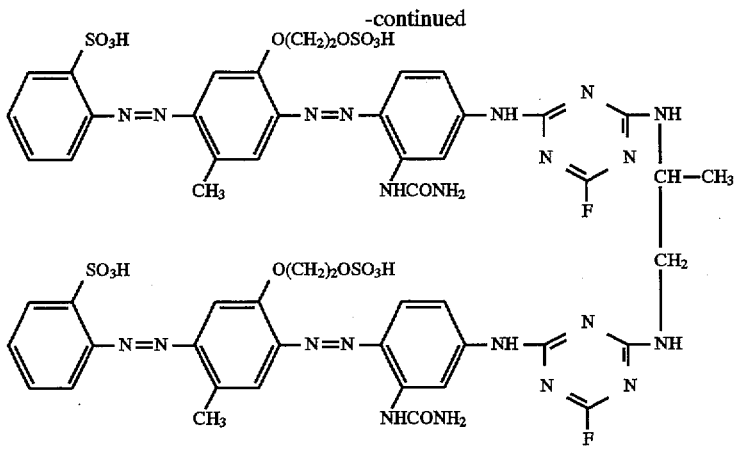

18 can be prepared in general accordance with the procedure of Example 8, which compounds also dye cotton in a brown shade having good allround fastness properties.

Dyeing Procedure I 2 parts of the reactive dye obtained in Example 1 are dissolved in 400 parts of water. To this solution are added 1500 parts of a solution which contains 53 g/l of sodium chloride. 100 parts of cotton fabric are put into this dyebath at 40° C. and, after 45 minutes, 100 parts of a solution containing 16 g/l of sodium hydroxide and 20 g/l of calcined sodium carbonate are added. The temperature of the dyebath is kept for another 45 minutes at 40° C. The dyed goods are then rinsed, soaped at the boil for a quarter of an hour with a non-ionic detergent, rinsed again and dried.

Dyeing Procedure II 2 parts of the reactive dye obtained in Example 1 are dissolved in 400 parts of water. To this solution are added 1500 parts of a solution which contains 53 g/l of sodium chloride. 100 parts of cotton fabric are put into this dyebath at 35° C. and, after 20 minutes, 100 parts of a solution containing 16 g/l of sodium hydroxide and 20 g/l of calcined sodium carbonate are added. The temperature of the dyebath is kept for another 15 minutes at 35° C. The temperature is then raised over 20 minutes to 60° C. and kept at this temperature for a further 35 minutes. The dyed goods are then rinsed, soaped at the boil for a quarter of an hour with a non-ionic detergent, rinsed again and dried.

Dyeing Procedure III 8 parts of the reactive dye obtained in Example 8 are dissolved in 400 parts of water. To this solution are added 1400 parts of a solution which contains 100 g/l of sodium sulfate. 100 parts of cotton fabric are put into this dyebath at 25° C. and, after 10 minutes, 200 parts of a solution containing 150 g/l of trisodium phosphate are added. The temperature of the dyebath is then raised over 10 minutes to 60° C. and kept at this temperature for a further 90 minutes. The dyed goods are then rinsed, soaped at the boil for a quarter of an hour with a non-ionic detergent, rinsed again and dried.

Dyeing Procedure IV 4 parts of the reactive dye obtained in Example 1 are dissolved in 50 parts of water. To this solution are added 50 parts of a solution which contains 5 g/l of sodium hydroxide and 20 g of calcined sodium carbonate. A cotton fabric is padded with the solution so obtained to a pick-up of 70% and rolled up. The cotton fabric is stored in this manner for 3 hours at room temperature. The dyed fabric is then rinsed, soaped at the boil for a quarter of an hour with a non-ionic detergent, rinsed again and dried.

Dyeing Procedure V 6 parts of the reactive dye obtained in Example 8 are dissolved in 50 parts of water. To this solution are added 50 parts of a solution which contains 16 g/l of sodium hydroxide and 0.04 l of sodium silicate (38° bé). A cotton fabric is padded with the solution obtained to a pick-up of 70%, rolled up and stored in this manner for 10 hours at room temperature. The dyed fabric is then rinsed, soaped at the boil for a quarter of an hour with a non-ionic detergent, rinsed again and dried.

Dyeing Procedure VI 2 parts of the reactive dye obtained in Example 1 are dissolved in 100 parts of water with the addition of 0.5 part of sodium m-nitrobenzenesulfonate. A cotton fabric is impregnated with the solution so obtained to a pick-up of 75% and then dried. The fabric is then impregnated with a 20° C. solution which contains 4 g/l of sodium hydroxide and 300 g of sodium chloride and then pinched off to a pick-up of 75%. The dyed fabric is steamed for 30 seconds at 100° to 102° C., rinsed, soaped at the boil for a quarter of an hour with a non-ionic detergent, rinsed again and dried.

Dyeing Procedure VII 0.1 part of the dye obtained in Example 8 is dissolved in 200 parts of demineralised water with the addition of 0.5 parts of Glauber's salt, 0.1 part of a levelling agent and 0.5 part of sodium acetate. The batch is then adjust to pH 5.5 with 80% acetic acid. The dye bath is heated to 50° C. over 10 minutes and then 10 parts of a wool fabric are put into it. The dye bath is heated to 100° C. over c. 50 minutes and dyeing is carried out for 60 minutes at this temperature. The dye bath is then cooled to 90° C. and the dyed fabric is taken out. The wool fabric is rinsed with warm and cold water and then spun and dried, giving a brown dyeing having very good fastness to light and wet treatment.

Printing Procedure I 3 parts of the reactive dye obtained in Example 1 are sprinkled, with rapid stirring, into 100 parts of a stock thickening which contains 50 parts of 5% sodium alginate thickening, 27.8 parts of water, 20 parts of urea, 1 part of sodium m-nitrobenzene-sulfonate and 1.2. parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

Printing Procedure II 5 parts of the reactive dye obtained in Example 8 are sprinkled, with rapid stirring, into 100 parts of a stock thickening which contains 50 parts of 5% sodium alginate thickening, 36.5 parts of water, 10 parts of urea, 1 part of sodium m-nitrobenzene-sulfonate and 2.5 parts of sodium hydrogen carbonate. A cotton fabric is printed with the printing paste so obtained, the stability of which meets the technical requirements, and dried. The printed fabric is steamed for 8 minutes at 102° C. in saturated steam, then rinsed, if necessary soaped at the boil, then rinsed once more and subsequently dried.

What is claimed is:

1. A compound of formula

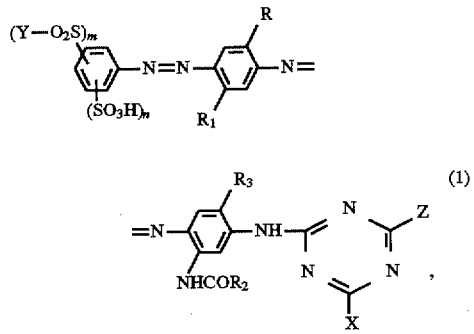

wherein R is $C_1$–$C_4$alkyl or $C_1$–$C_4$alkoxy which is unsubstituted or substituted in the alkyl moiety by hydroxy, $C_1$–$C_4$alkoxy or sulfato, $R_1$ is —$NHCOR_2'$ group, $R_2$ and $R_2'$ are each independently of the other $C_1$–$C_4$alkyl or —$NH_2$, $R_3$ is hydrogen, $C_1$–$C_4$alkyl, $C_1$–$C_4$alkoxy or halogen, X is fluoro, Y is vinyl or a —$CH_2$—$CH_2$—U radical and U is a leaving group, m is 0 or 1, and n is a number from 0 to 2, the sum of (n+m) being ≧ 1, and Z is a non-reactive amino radical, or a radical of formula ing of amino; N—$C_1$–$C_4$alkylamino or N,N-di-$C_1$–$C_4$alkylamino, wherein alkyl is in each case unsubstituted or substituted by sulfo, sulfato, hydroxy, carboxy or phenyl; cyclohexylamino; phenylamino or naphthylamino, wherein phenyl or naphthyl is in each case unsubstituted or substituted by $C_1$–$C_4$alkyl, $C_1$–$C_4$alkoxy, amino, $C_2$–$C_4$alkanoylamino, carboxy, sulfo or halogen; N—$C_1$–$C_4$alkyl-N-phenylamino, wherein alkyl and phenyl is each unsubstituted or substituted as described above; and morpholino.

8. A compound according to claim 7, wherein Z is amino, unsubstituted or sulfo-substituted N-mono- oder N,N-di-$C_1$–$C_2$alkylamino, phenylamino which is substituted by 1 to 3 identical or different radicals selected from the group consisting of methyl, methoxy and sulfo, or 1- or 2-naphthylamino carrying 1 to 3 sulfo groups.

9. A compound according to claim 1, wherein Z corresponds to a radical of formula (2), wherein p is 1, and B is a diamino radical of formula

wherein $B_1$ is an aliphatic, cycloaliphatic, aromatic or araliphatic linking group, and $R_4$ and $R_4'$ are each independently of the other hydrogen or $C_1$–$C_4$alkyl which is unsubstituted or substituted by hydroxy, $C_1$–$C_4$alkoxy or sulfato.

10. A compound according to claim 9, wherein $B_1$ is straight-chain or branched $C_2$–$C_{12}$alkylene which is unsubstituted or substituted by hydroxy, sulfo or sulfato or which is interrupted by —O—, —NH— or —N(CH$_3$)—.

11. A compound according to claim 9, wherein $B_1$ is straight-chain or branched $C_2$–$C_6$alkylene.

12. A compound according to claim 1 of formula

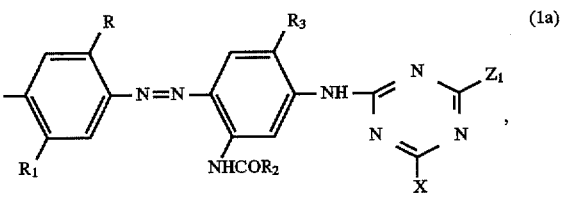

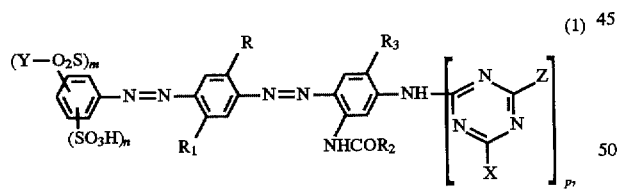

wherein R, $R_1$, $R_2$, $R_3$, X, m and n have the meaning given above, B is the radical of an aliphatic, aromatic, araliphatic or cycloaliphatic diamine, and p is 0 or 1.

2. A compound according to claim 1, wherein X is fluoro and m is 0.

3. A compound according to claim 1, wherein R is methyl, ethyl, methoxy, ethoxy or $C_1$–$C_2$alkoxy which is substituted in the alkyl moiety by hydroxy, methoxy or sulfato.

4. A compound according to claim 1, wherein $R_1$ is —$NHCOCH_3$, —$NHCOC_2H_5$ or —$NHCONH_2$.

5. A compound according to claim 1, wherein $R_2$ is methyl or —$NH_2$.

6. A compound according to claim 1, wherein $R_3$ is hydrogen, methyl, methoxy or chloro.

7. A compound according to claim 1, wherein Z is a non-reactive amino radical selected from the group consistwherein R is methyl, methoxy, β-hydroxyethoxy, β-sulfatoethoxy or β-hydroxyethoxy, $R_1$ is methyl or a —$NHCOR_2'$ group, $R_2$ and $R_2'$ are each independently of the other —$NH_2$, $R_3$ is hydrogen, methyl, methoxy or chloro, X is fluoro, m is 0, n is 1 or 2, and $Z_1$ is amino, unsubstituted or sulfo-substituted N-mono- or N,N-di-$C_1$–$C_2$alkylamino, phenylamino which is substituted by 1 to 3 identical or different radicals selected from the group consisting of methyl, methoxy and sulfo, or 1- or 2-naphthylamino carrying 1 to 3 sulfo groups.

13. A compound according to claim 1 of formula

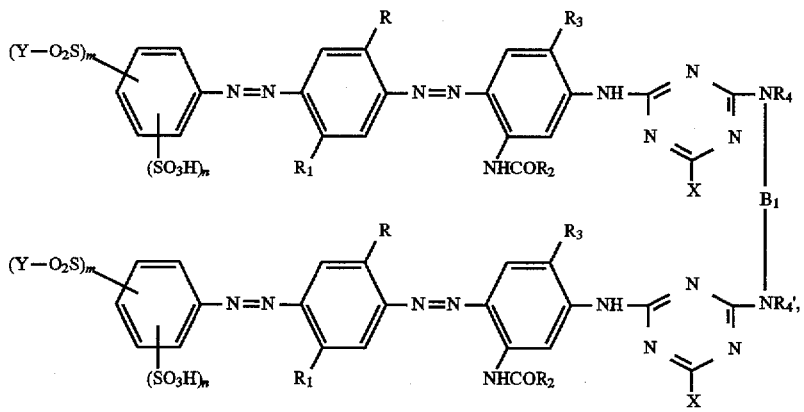

wherein R is methyl, methoxy, β-hydroxyethoxy, β-sulfatoethoxy or β-hydroxyethoxy, $R_1$ is methyl or a —$NHCOR_2'$ group, $R_2$ and $R_2'$ are each independently of the other —$NH_2$, $R_3$ is hydrogen, methyl, methoxy or chloro, $R_4$ and $R_4'$ are each hydrogen, X is fluoro, m is 0, n is 1 or 2, and $B_1$ is straight-chain or branched $C_2$–$C_6$alkylene which is unsubstituted or hydroxy-substituted.

14. A process for the preparation of a compound of formula (1) as claimed in claim 1, which comprises condensing an aminodiazo compound of formula

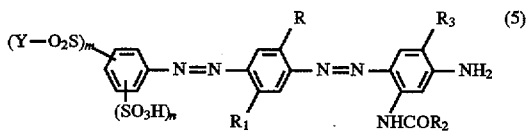

with a triazine of formula

and an amine of formula

H—Z    (7)

in any order, R, $R_1$, $R_2$, $R_3$, X, Y, Z, m and n each having the meaning claimed in claim 1.

15. A process for dyeing or printing a hydroxyl group-containing or nitrogen-containing fiber material, which comprises applying to said fiber material a compound of formula (1) according to claim 1.

16. A process according to claim 15 for dyeing or printing a cellulosic fiber material.

* * * * *